US006829769B2

(12) United States Patent
Cranston et al.

(10) Patent No.: US 6,829,769 B2
(45) Date of Patent: Dec. 7, 2004

(54) HIGH PERFORMANCE INTERPROCESS COMMUNICATION

(75) Inventors: Wayne M. Cranston, Sammamish, WA (US); Min-Yu Yang, Issaquah, WA (US); Michael J. Purtell, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 500 days.

(21) Appl. No.: 09/823,124

(22) Filed: Mar. 30, 2001

(65) Prior Publication Data

US 2002/0144006 A1 Oct. 3, 2002

Related U.S. Application Data

(60) Provisional application No. 60/238,106, filed on Oct. 4, 2000.

(51) Int. Cl.[7] .................................................. G06F 9/46
(52) U.S. Cl. ....................................... 719/312; 711/209
(58) Field of Search ................................ 709/216, 310, 709/312, 314; 719/216, 310, 312; 711/209

(56) References Cited

U.S. PATENT DOCUMENTS

| 4,670,899 A | * | 6/1987 | Brody et al. ................. 455/453 |
| 5,185,861 A | * | 2/1993 | Valencia ...................... 711/120 |
| 5,381,413 A | * | 1/1995 | Tobagi et al. ................ 370/448 |
| 5,544,316 A | * | 8/1996 | Carpenter et al. ........... 709/310 |
| 5,555,387 A | * | 9/1996 | Branstad et al. ............ 711/209 |
| 5,606,666 A | * | 2/1997 | Grant et al. ................. 709/216 |
| 5,617,570 A | * | 4/1997 | Russell et al. .............. 709/312 |
| 5,737,605 A | * | 4/1998 | Cunningham et al. ...... 709/312 |
| 5,796,393 A | * | 8/1998 | MacNaughton et al. .... 345/733 |
| 5,809,320 A | * | 9/1998 | Jain et al. ..................... 712/34 |
| 5,896,495 A | * | 4/1999 | Stein et al. ................... 714/38 |
| 5,911,776 A | * | 6/1999 | Guck .......................... 709/217 |
| 5,916,307 A | * | 6/1999 | Piskiel et al. ............... 709/314 |
| 5,949,972 A | * | 9/1999 | Applegate .................... 714/54 |

* cited by examiner

Primary Examiner—Meng-Al T. An
Assistant Examiner—Edward Bross
(74) Attorney, Agent, or Firm—Workman Nydegger

(57) ABSTRACT

Methods, systems, and computer program products for high-performance interprocess communication. Each process dynamically identifies routines responsible for managing communication received from other processes through a shared memory heap and a shared memory queue, each of the routines handling one or more operation codes. An allocation from the shared heap produces a process agnostic memory handle from which a process specific memory pointer may be obtained. Using the memory pointer, the enqueuing process places an operation code, parameters, and any other relevant data in the allocated memory and adds the memory handle to a shared queue. The dequeuing process removes the memory handle from the queue and generates a memory pointer to access the allocated memory in the dequeuing process. Upon retrieving the operation code from the allocated memory, the dequeuing process calls the appropriate handler routine. Enqueues may be registered to account for expected responses that are not received.

70 Claims, 8 Drawing Sheets

HIGH PERFORMANCE INTERPROCESS COMMUNICATION

RELATED APPLICATIONS

This application claims the benefit of U.S. Provisional Application No. 60/238,106, entitled "ExIPC", and filed on Oct. 4, 2000, which is hereby incorporated by reference.

BACKGROUND OF THE INVENTION

1. The Field of the Invention

The present invention relates to interprocess communication. More specifically, the present invention relates to methods, systems, and computer program products for high-performance interprocess communication that minimizes context switches, kernel transitions, and blocking.

2. Background and Related Art

Various technologies are available for communicating information from one process to another. Among the most well-known technologies for interprocess communication are remote procedure calls ("RPC"), lightweight remote procedure calls ("LRPC"), and components based on COM or DCOM. For the most part, well-known interprocess communication techniques are general-purpose solutions that must satisfy a variety of competing interests. One significant drawback to general-purpose solutions is the need to account for the lowest common denominator, foregoing optimizations that might otherwise be available to a particular implementation. As a result, generic interprocess communication often imposes a substantial amount of overhead that tends to degrade throughput and overall performance. Among other things, interprocess communication may increase blocking, kernel transitions, and context switches, with the effect particularly pronounced when two server processes must communicate frequently in achieving a common goal or task.

Because of the higher overhead that interprocess communication is likely to introduce, programs running on a server are often written as monolithic processes to maximize performance. Nevertheless, dividing a particular task into several well-defined processes may provide a substantial benefit in simplifying program design. In choosing between potential improvements in performance versus potential improvements in program design, however, performance frequently is given more weight because end-users invariably detect slow program execution, whereas internal program design is much more difficult for end-users to quantify.

When multiple processes run concurrently on a single processor, the state information that distinguishes one process from another must be kept separate. Switching from one process to another requires storing the state information for the currently executing process and loading the state information for the process to be executed. The storing and loading of state information is known as a context switch. A context switch does not involve executing the instructions of a particular process to achieve a given goal or task; rather, a context switch is merely preparation for executing the instructions of a particular process. The more time spent switching from one process to another, the less time available for running the processes themselves. Of course, some environments may include excess computing resources or sufficient user interaction such that context switches do not represent a significant burden. In other environments, however, especially environments where one process provides one or more services to other processes, context switches may represent a significant amount of processing time that would boost performance if eliminated or reduced.

One way to diminish the impact of context switches is to shrink the amount of state information that must be stored and loaded. So-called lightweight processes or threads are directed largely toward to goal of minimizing state information and the corresponding performance detriments of context switching. Nevertheless, although reduced in extent, whether context switches involve processes or some type of lightweight counterpart, the execution time required for storing and loading context information diminishes performance. Naturally, as the number of competing processes increases, the amount of processor time devoted to context switching may increase as well. Because many of the issues involving interprocess communication are similar for processes, threads, lightweight processes, etc., the term "process" as used throughout this application should be interpreted as a generic term that encompasses all entities capable execution, including threads, lightweight processes, and the like.

Another factor to consider in evaluating the performance of interprocess communication is the execution time required to marshal data. Data marshaling accounts for system or process differences. For example, the address space of one process may be distinct from the address space of another process, one process may represent data differently from another, etc. Therefore, marshaling generally includes copying parameters, return values, and/or other exchanged data from one process to a shared memory area and then from the shared memory area to another process. As part of the copying, data may be formatted in a portable structure to account for any differences in how the processes represent data. Depending on the data to be exchanged, data marshaling may involve copying, probably multiple times, large amounts of data from one memory location to another. Like context switches, marshaling data is overhead to interprocess communication in which a particular process does not make further progress in achieving its goal or task, but rather, simply prepares for making progress.

At times, one process may need one or more services that another process provides. In using the services of another process, one process often communicates parameters and/or data to the process implementing the needed services and waits for a response. While waiting, the process is "blocked." Blocking is a mixed bag of sorts. A blocked process does not receive any execution time because it is unable to run. By blocking, the process will not be available for a context switch that, if it occurred, would be followed immediately by another context switch because the blocked process cannot continue further processing until it receives a response. Thus, in one sense, blocking saves unproductive context switches. At the same time, however, blocking virtually guarantees one or more context switches. As soon as a process blocks, another process must be selected to run, resulting in one context switch. Then, at a later time when the blocked process receives its response, another context switch occurs to allow the now unblocked process to continue execution.

To illustrate as least some of the foregoing problems, consider the following overview of LRPC. As indicated above, LRPC stands for local remote procedure call and differs from RPC mostly in its underlying implementation. LRPC is used for RPC calls that stay on the same machine, as automated by the RPC subsystem. Rather than network transfer, LRPC uses shared memory for data transfer.

As a specific example, consider LRPC communication between process A and process B. Process A calls into its side of an RPC handler which marshals its data into shared memory, signals process B to handle the call, and then blocks the thread until process B signals that it has completed the request. Process B wakes up when signaled, unmarshals the shared memory data, and calls the registered function with the unmarshaled parameters. Process B waits for the function to return, marshals any return data into shared memory, and then signals process A that it is done. Process A then wakes up, unmarshals the return data, and the RPC routine returns to the caller. Note that LRPC involves multiple context switches, a significant amount of data marshaling, and synchronous interprocess communication that blocks further process execution.

SUMMARY OF THE INVENTION

The present invention provides for high-performance interprocess communication without the prohibitive overhead that may be imposed by prior art techniques. During an initialization phase, each side dynamically identifies one or more routines that are responsible for handling communication received from other processes. Communication between processes occurs through a shared memory heap and a shared memory queue. Allocations from the shared memory heap produce a process agnostic memory handle and a process specific memory pointer. Using the memory pointer, the enqueuing process places an operation code, parameters, and any other relevant data in the allocated memory. The enqueuing process then adds the memory handle to the shared memory queue. The dequeuing process uses the memory handle from the shared memory queue to generate a valid memory pointer so that the allocated shared memory can be accessed in the dequeuing process. By allowing direct access to shared memory in each process, the present invention may reduce the amount of data marshaling that otherwise may be required. Upon retrieving the operation code that was placed in the allocated memory, the dequeuing process calls the routine, identified during the initialization phase, that corresponds to the operation code.

When an enqueuing process expects a response back from the dequeuing process, the request may be registered. Upon receiving the response, the enqueuing process removes the request from the register. However, if the dequeuing process is unable to respond, the enqueuing process uses the registration information to free resources allocated to the request and perform any other needed cleanup operations. The dequeuing process may be unable to respond due to a variety of circumstances. For example, the dequeuing process may be shutting down for some reason or the dequeuing process may have experienced a catastrophic failure and been terminated. Thus, depending on the circumstances, the dequeuing process may notify the enqueuing process that it will not respond to any outstanding requests.

The enqueuing and dequeuing operations are asynchronous, thereby allowing multiple enqueues and/or multiple dequeues without a context switch. A signaling arrangement may be used by the enqueuing process to notify the dequeuing process of memory handles that have been added to the shared memory queue. Through the signaling arrangement, the enqueuing process and dequeuing process may help each other in determining the resources that should be devoted to removing memory handles from the shared memory queue and processing the corresponding operation codes. Furthermore, the enqueuing process may reserve space for a response in the shared memory queue. The reserved space assures that the response will not be delayed or cause significant processing overhead due to a fall queue. For example, without reserved space, a response may need to be retried repeatedly until it succeeds or placed on a retry queue which may grow without bound.

In one implementation, the present invention has been used in providing access to content. One process is responsible for content operations and another process is responsible for connection operations. The connection process includes a controller and a bi-directional queue for each supported protocol. A completion port and thread manager pool threads available for dequeuing operations, and a registration controller tracks enqueued communication where a response is expected. Similarly, the store process also includes a controller for each supported protocol, a completion port and thread manager for pooling threads available for dequeuing operations, and a registration controller for tracking enqueued communication where the store process expects a response. Both the connection process and the store process identify handler routines for the operation codes associated with each supported protocol.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE INVENTION

The present invention extends to methods, systems, and computer program products for high-performance interprocess communication. Processes communicate with each other through a shared memory heap and a shared memory queue. An enqueuing process places an instruction and possibly other data in memory allocated from the shared memory heap and adds a process agnostic memory handle to a shared memory queue. A dequeuing process removes the process agnostic memory handle from the shared memory queue and processes the instruction using routines that are identified dynamically. The embodiments of the present invention may comprise a special purpose or general purpose computer including various computer hardware, as discussed in greater detail below.

Embodiments within the scope of the present invention also include computer-readable media for carrying or having computer-executable instructions or data structures stored thereon. Such computer-readable media can be any available media which may be accessed by a general purpose or special purpose computer. By way of example, and not limitation, such computer-readable media may comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
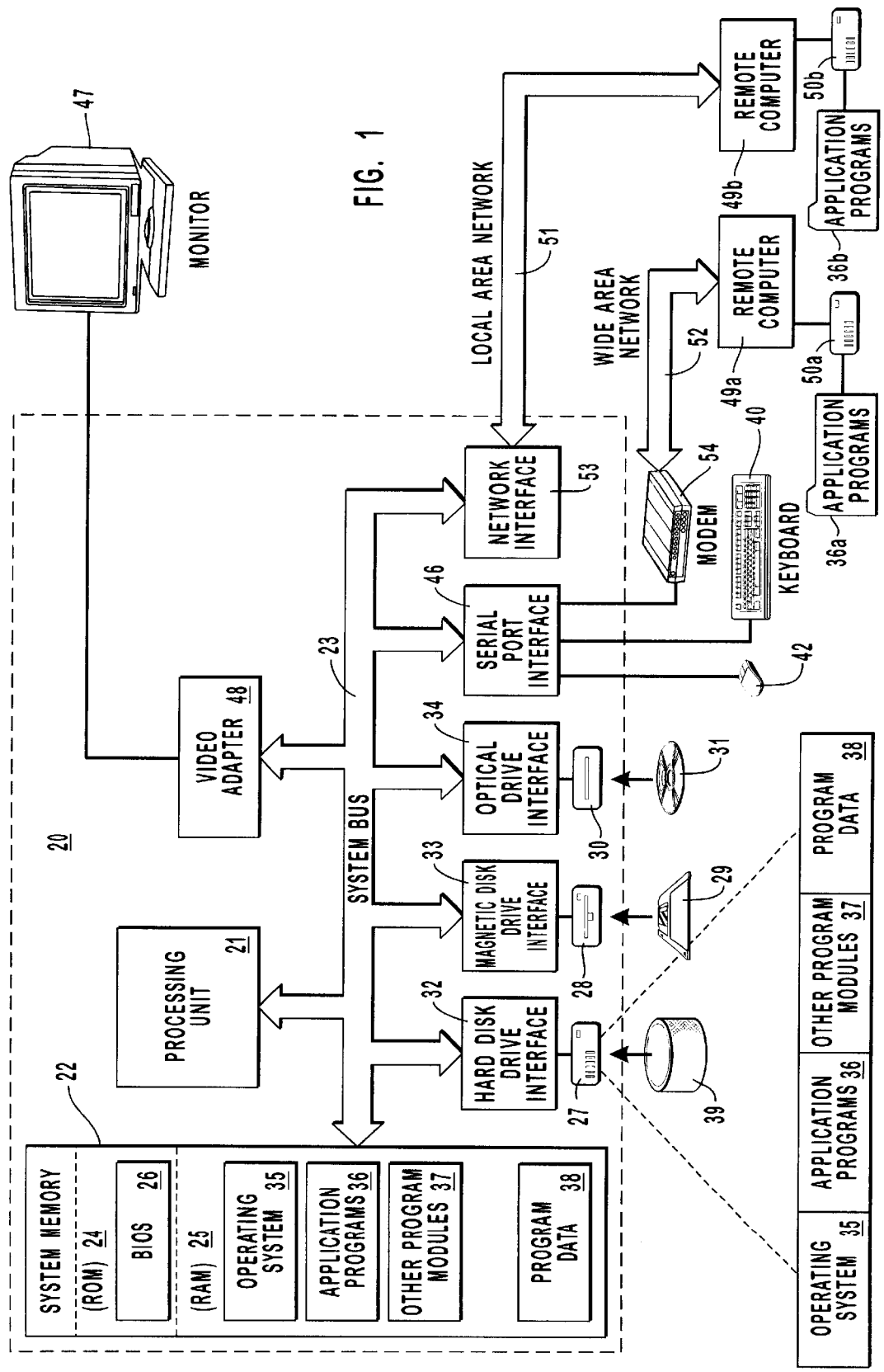
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked enviromnent using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

Figure 2:
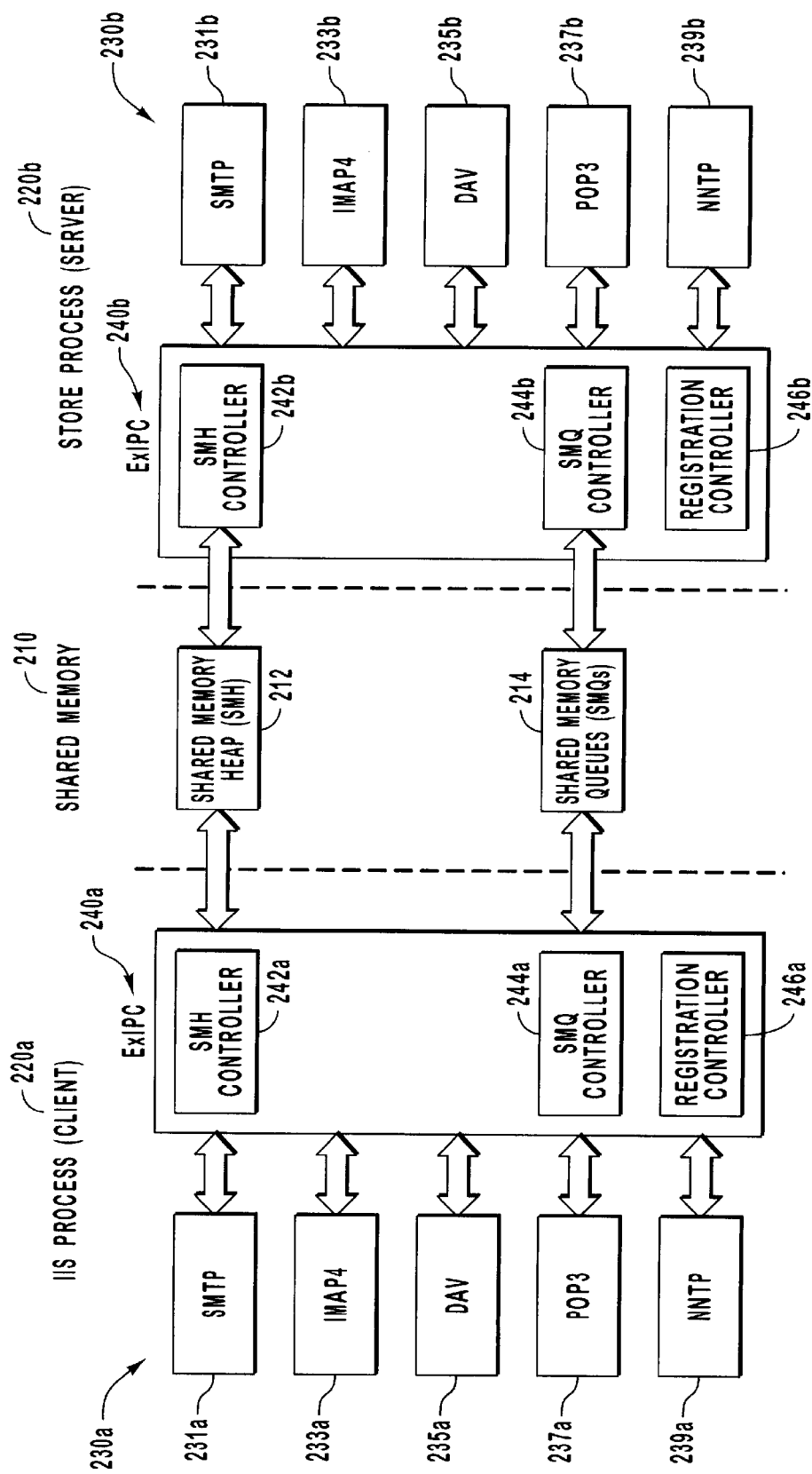
FIG. 2 is a block diagram of an embodiment of the present invention used in providing access to content.

FIG. 2 is a block diagram of an embodiment of the present invention that includes Internet Information Server ("IIS") process 220a communicating with store process 220b through shared memory 210. Shared memory 210 includes a shared memory heap ("SMH") 212 and one or more shared memory queues ("SMQs") 214, wherein shared memory heap 212 comprises one or more block heaps. When allocating shared memory, SMH 212 provides a process agnostic memory handle that may be exchanged between IIS process 220a and store process 220b through SMQs 214. One process places an instruction, parameters, other relevant data, etc. in the allocated shared memory where they may be accessed by the other process.

Store process 220b is responsible for managing content operations and IIS process 220a is responsible for managing connection operations. In this embodiment, IIS process 220a is a client requesting content from a server, store process 220b. In general, a client is a consumer of resources and a server is a provider of resources. Those of skill in the art will recognize, however, that a server in one context may be a client in another context. Likewise, a client in one context may be a server in another context. As used in this application, therefore, the terms client and server should not be interpreted as mutually exclusive. Furthermore, it should be emphasized that the present invention may be practiced between any arbitrary processes. Communication between a client process and a server process, as shown in FIG. 2, is merely exemplary and should not be viewed as limiting the scope of the present invention.

IIS process 220a supports connections over a variety of communication protocols 230a, including simple mail transfer protocol ("SMTP") 231a, Internet messaging protocol version 4 ("IMAP4") 233a, distributed authoring and versioning protocol ("DAV") 235a, post office protocol version 3 ("POP3") 237a, and network news transfer protocol ("NNTP") 239a. Note that store process 220b supports access to content over corresponding communication protocols 230b, namely simple mail transfer protocol ("SMTP") 231b, Internet messaging protocol version 4 ("IMAP4") 233b, distributed authoring and versioning protocol ("DAV") 235b, post office protocol version 3 ("POP3") 237b, and network news transfer protocol ("NNTP") 239b. Those of skill in the art will recognize that the present invention is not necessarily limited to supporting any particular protocol.

ExIPC 240a is responsible for handling interprocess communication on the IIS process 220a side and ExIPC 240b is responsible for handling interprocess communication on the store process 220b side. Each communication protocol 230a and 230b has a dedicated bi-directional shared memory queue ("SMQ" or simply "queue") 214, with a single SMQ controller 244a and 244b on each side of the communication. For the embodiment of FIG. 2, each SMQ 214 is a pair of unidirectional shared memory queues. The SMQ controllers 244a and 244b manage enqueue operations and use a completion port and thread manager to pool threads that are available for dequeuing operations. Memory management operations on shared memory heap ("SMH") 212 are performed by SMH controllers 242a and 242b. Registration controllers 246a and 246b track enqueued communication where a response is to be guaranteed.

Figure 3:
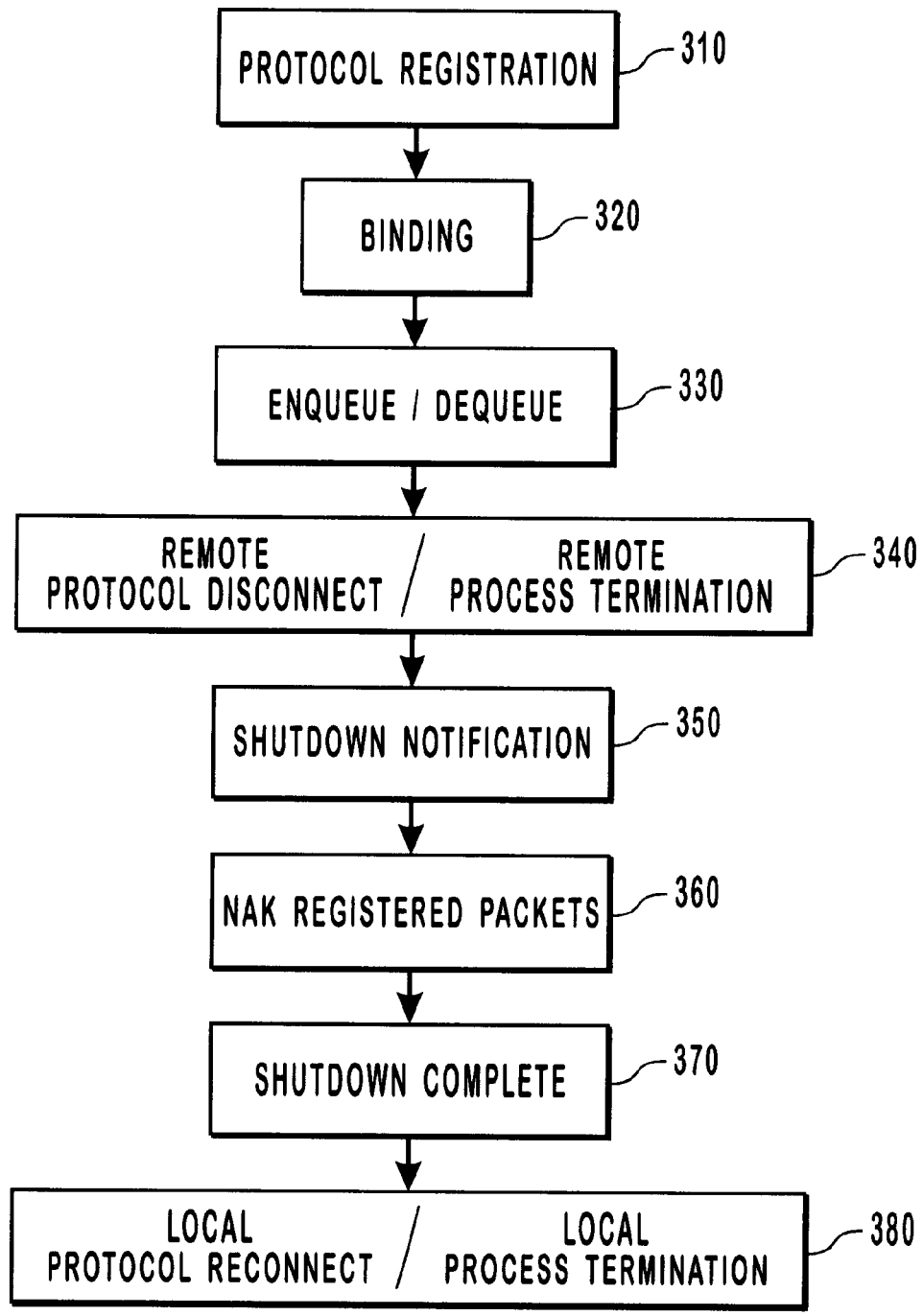
FIG. 3 shows a life-cycle flow diagram corresponding to the embodiment depicted in FIG. 2.

FIG. 3 shows a life-cycle flow diagram corresponding to the embodiment depicted in FIG. 2. More detail will be provided with respect to the discussion of FIGS. 4–6. During protocol registration 310, each side registers the protocols that it supports and expects to use, and one side creates a SMQ for each of the registered protocols. Binding 320 identifies the completion port that will be used to pool threads for a particular queue and insures that each side has registered a protocol, so that an endpoint exists for each side of the communication that will occur. Communication between the processes includes a series of enqueues/dequeues 330 of process agnostic memory handles using the SMQ. (Each memory handle corresponds to an allocation from the SMH that contains an instruction and any data needed or useful in processing the instruction.) Remote protocol disconnect/remote process termination 340 indicates that one side of the communication is no longer able to function, either for a particular protocol or for all protocols. Upon receiving a shutdown notification 350 from the remote process, the local process NAKs registered packets 360. After NAKing registered packets 360, shutdown is complete 370, the SMQ is released, and the local process has at least two options: attempt local protocol reconnect/local process termination 380. Reconnection begins with creating a new SMQ in protocol registration 310 as identified above.

Figure 4:
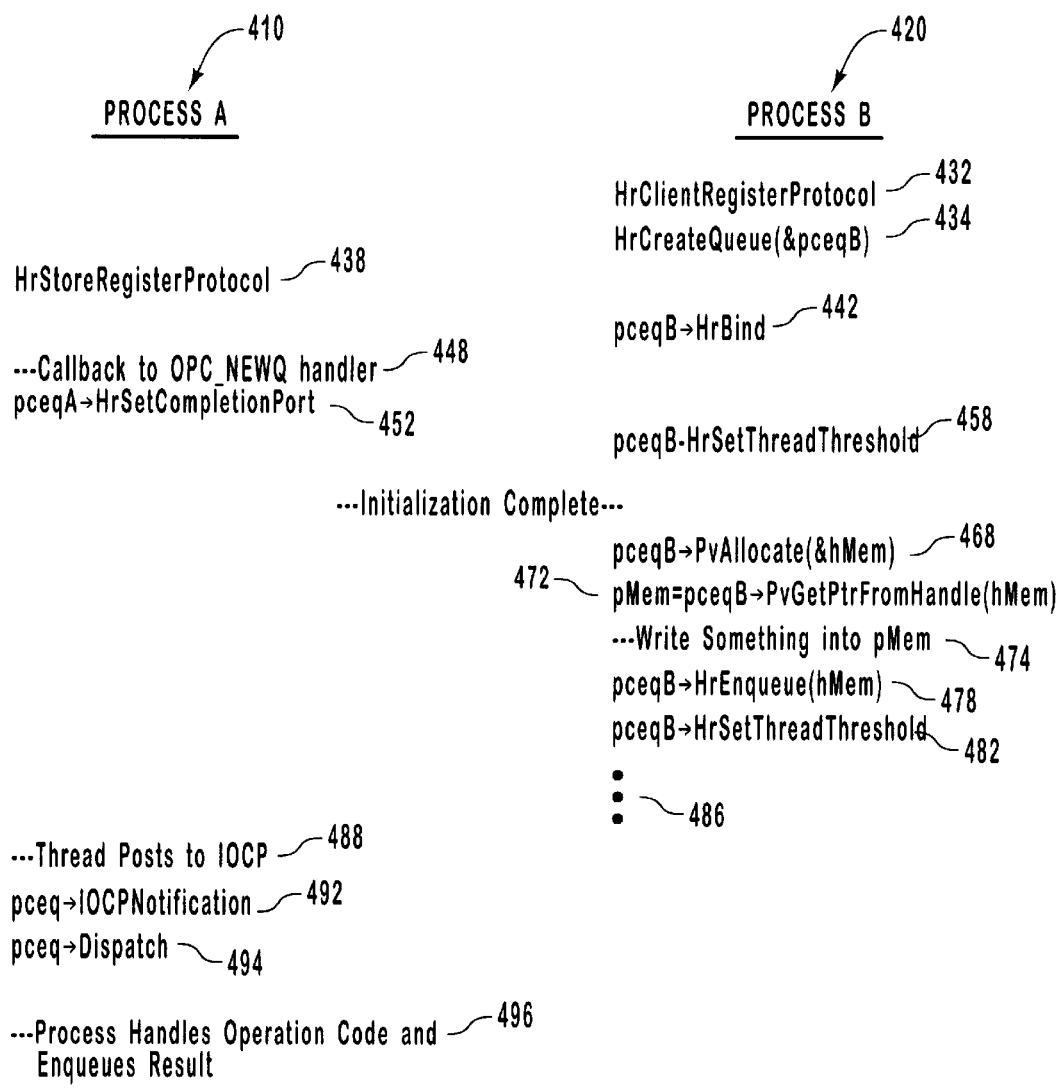
FIG. 4 is an application program interface or API representation of high-performance interprocess communication in accordance with the present invention.

FIG. 4 is an application program interface ("API") representation of high-performance interprocess communication in accordance with the present invention. More specifically, FIG. 4 shows the sequence of function calls used for communication between process A 410 and process B 420. Running process A 410 and process B 420 on separate processors may significantly reduce the number of context switches that occur, but the achieving the benefits the present invention does not require the use of multiple processors. Note that only certain parameters are shown for simplicity. Other parameters may be described in conjunction with individual routines. Furthermore, many functions include a return value that may be used for error checking. For example, functions with a prefix of "Hr" return a particular type of status as a result, functions with a "Pv" prefix return a generic pointer, and function without a prefix generally do not return any value. Those of skill in the art will recognize that a wide variety of return values and parameters may be used on connection with the present invention and that the specific details included in this application are merely exemplary.

In HrClientRegisterProtocol 432, process B 420 identifies a protocol to register, the protocol version, a global context so that handler functions can access global information about the protocol, relevant flags, handler functions or routines, an existing shared memory heap, and the version of the API. Because each protocol defines the operation codes or instructions that the protocol supports, the handler functions are protocol specific. (An operation code is an example of an instruction and should not be considered as necessarily limiting the present invention.)

HrCreateQueue(&pceqB) 434 creates a SMQ for a particular protocol, where the queue may be accessed through the "pceqB" parameter. Because each side shares a single SMQ for each protocol, only one side creates the SMQs. In many respects the decision as to which side creates the queue is somewhat arbitrary. It is only important that the SMQs are created and that a particular queue is created only one time. For the embodiment shown in FIG. 2, the client is responsible for creating the SMQs 214 (FIG. 2).

Like the call to HrClientRegisterProtocol 432 in process B 420, the call to HrStoreRegisterProtocol 438 in process A 410 identifies a protocol to register, the protocol version, a global context so that handler functions can access global information about the protocol, relevant flags, handler functions or routines, an existing shared memory heap, and the version of the API. Once each side has registered for a particular protocol and the corresponding SMQ is created, pceqB->HrBind 442 attempts to bind the queue between the two processes. In calling pceqB->HrBind 442, process B 420 identifies a hint for the maximum number of entries the SMQ will support, relevant flags, a wait time for the queue to be bound, a client side completion port that pools threads used in draining the queue, and a completion key to sort out the various status packets that may be posted to the completion port. The pceqB->HrBind 442 function will not succeed until both sides have mutually agreed on the binding for a particular protocol.

Each protocol may need to register handlers for specific operation codes or handle them in a default handler. For example, the server or store side, process A 410, registers a handler for the new queue operation code. A callback to OPC_NEWQ handler 448 allows process A 410 to set the completion port for the store side of the interprocess communication with a call to pceqA->HrSetCompletionPort 452. Recall that process B 420 set the completion port for the client side of the interprocess communication in the call to pceqB->HrBind 442.

Each side also may need other handlers, such as a handler to initiate closing an SMQ and a handler to close a queue once it has been emptied. For example, one side may need to shutdown a queue or one side may crash. By calling the other side's initiate close handler, either with an operation code or by a signal, the other side knows to stop using and to drain the queue. Once an SMQ is empty, any memory allocated from the queue is freed and the queue is released. A new SMQ can be created with the client side calling HrCreateQueue(&pceqB) 434, but the store side waits for the client side to recreate the queue.

A call to pceqB->HrSetThreadThreshold 458 specifying the minimum number of dequeue threads, the maximum number of dequeue threads, and a threshold value for when new threads should be created completes initialization for a particular protocol. Two particular types of threads are used in the embodiment shown in FIG. 2: notify threads and worker threads. Each protocol in each process includes a notify thread for receiving event signals from other processes, such as a signal for new entries in a queue, a shutdown signal, a process termination signal if another process terminates unexpectedly, etc.

When a notify thread receives a new queue entry event signal, the thread posts a completion status packet to the completion port identified in creating the SMQ. Each process implements its own thread pool, which listens on the completion port and dispatches a new or idle worker thread each time a completion status packet is received. The worker threads dequeue items from the SMQ for processing. When processing for a particular item is finished, the same worker thread is used to dequeue the SMQ until the queue is completely drained, at which time the thread is returned to the thread pool.

Some overhead is likely to accompany a new queue entry event signal, such as a process context switch, posting a completion status packet, dispatching a new or idle worker thread, etc. By implementing thread thresholds for firing new queue entry event signals, the amount of overhead may be controlled to some extent. In particular, a new queue entry event signal only occurs if the maximum number of worker threads has not been reached and the number of items in the queue divided by the threshold is greater than the current number of worker threads in the peer process.

This implies that the enqueuing process determines when its peer, the dequeuing process, needs more worker threads. The reason for this is that the enqueuing process actively knows when there are new entries in the SMQ (because it adds them) and is able to apply the foregoing logic for determining if a new queue entry event signal should be fired. Furthermore, the enqueuing process may add a number of items to the SMQ in relatively rapid succession, and then make the determination only once based on all of the newly added items.

Figure 5:
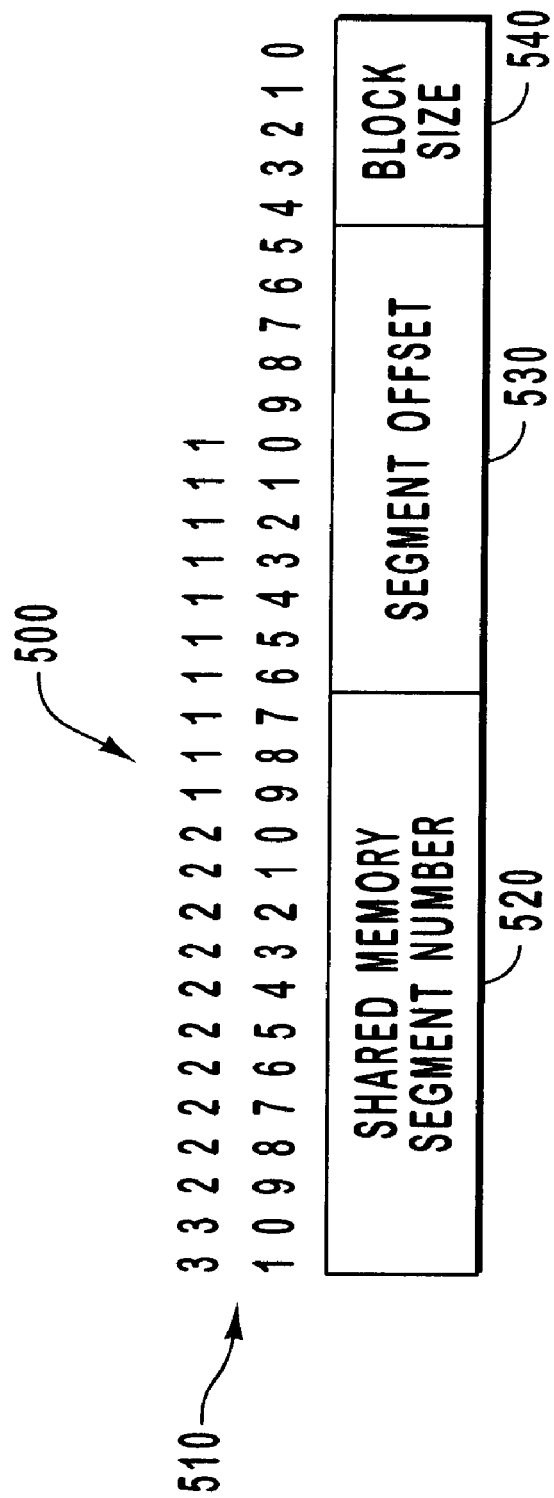
FIG. 5 illustrates an exemplary process agnostic memory handle.

With initialization complete, process B 420 is ready to enqueue items to the SMQ and process A 410 is ready to dequeue items from the SMQ. In the pceqB->PvAllocate (&hMem) 468 call, process B 420 allocates memory from the SMH. The resulting process agnostic memory handle, hMem, is used to obtain a pointer to the shared memory with the pMem=pceqB->PvGetPtrFromHandle(hMem) 472 call. (An exemplary process agnostic memory handle is illustrated in FIG. 5 and will be described in more detail below, following which, the allocation of shared memory from one or more shared memory block heaps will be described with reference to FIG. 6.) Either side of the process boundary, process A 410 and process B 420 can obtain a valid pointer from hMem. Those of skill in the art will recognize that memory may be accessed in a wide variety of ways, some of which may be unique to a particular programming language or environment. As such, the term pointer should be interpreted broadly to encompass all forms of memory access, including all direct and indirect forms of access, such as pointers, references, handles, etc. Using pMem, process B 420 writes to the allocated shared memory 474 as needed or desired.

Turning briefly now to FIG. 5, an exemplary process agnostic memory handle 500 is illustrated. Bit positions 510 indicate that 32 bits are used to represent the process agnostic memory handle. Fifteen bits, positions 17–31, specify a shared memory segment number 520, to distinguish between the various segments available in a particular shared memory heap. Twelve bits, positions 5–16, specify a segment offset 530 within a given shared memory segment. As noted previously, the shared memory is implemented as a block heap, meaning that each segment will be divided into one or more blocks. Five bits, positions 0–4, specify the block size of an allocation for a given process agnostic memory handle. For the embodiment shown in FIG. 2, block sizes are powers of two between 32 bytes and 32 kilobytes.

Figure 6:
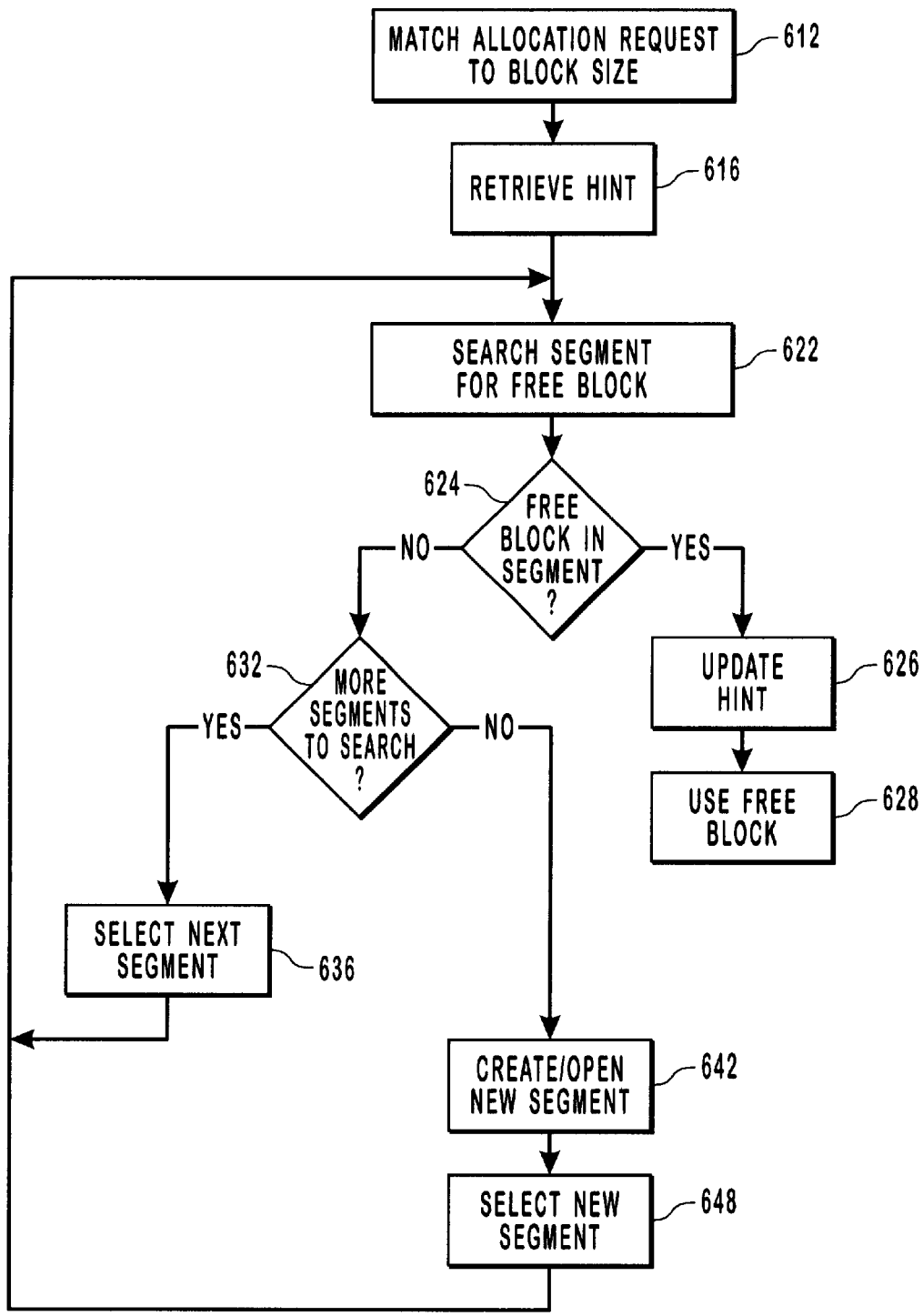
FIG. 6 is a flow diagram of shared memory allocation from one or more shared memory block heaps.

Next, the allocation of shared memory from one or more shared memory block heaps will be described with reference to FIG. 6. Each block heap comprises a table of shared memory segments ("SMSs") that are allocated and initialized on demand. As indicated with respect to FIG. 5, blocks of memory ranging from 32 bytes to 32 kilobytes are available. Therefore, an allocation request is first matched to an available block size 612 so that the appropriate block heap may be selected. For example, the requested allocation size may be rounded up to the next highest power of two. Once an appropriate block heap is identified, a hint is retrieved 616 to facilitate searching for an available free block. Each SMS has a linked list of free blocks and the hint identifies the lowest segment number that may contain a free block.

After a particular segment is identified, the segment is searched for a free block 622. If the search finds a free block in the segment ("yes" branch of decision block 624) the hint is updated 626 and that free block is used 628. When allocating, the hint is updated with the index of the segment from which the allocation occurs if the segment index is less than the hint. Similarly, when a block is freed (not shown) the hint is set to the index of the SMS of the freed block if the new index is less than the current value of the hint. Note that there is no multithreading protection for the SMS index to begin searching because it is meant to serve only as a hint of where to start searching for free blocks. If none of the blocks are held for relatively long periods of time, the result of the hint is that as the number of outstanding allocations decreases, the allocated blocks are consolidated in the lower indexes. Even though the higher indexes have allocated SMSs, their lack of use reduces the working set for the block heaps of the SMH to the lower indexes and the minimal needed working set to support the allocated blocks. The degree of success offered by this strategy, however, depends on the allocation patterns of the processes allocating shared memory.

If the search is unable to find a free block in the segment ("no" branch of decision block 624) then decision block 632 determines if there are more segments to search. If so, the next SMS in the table is selected 636 and processing continues by searching that segment for a free block 622. When the end of the table is reached at decision block 632, searching resumes at the beginning of the table and ends with the first SMS that was checked. If no free blocks are found after checking each SMS ("no" branch of decision block 632) a new segments is created or opened 642. Another process may have created a new segment that the allocating process did not identify in decision block 632. Prior to creating a new segment, a check is made to see if another process has created a new segment. Otherwise, a new segment is created by allocating and initializing a new SMS. The new (created or opened) SMS is selected 648 and processing continues by searching that segment for a free block 622.

Returning now to FIG. 4, pceqB->HrEnqueue(hMem) 478 enqueues an item to the shared memory queue by identifying the process agnostic memory handle to enqueue, the operation code for the handler on the other side, relevant flags, context information for the server and client, whether or not a serial number should be created to register the enqueued item, a status or return code if the enqueue is a response, and an identifier for a state object. At least three types of enqueue operations are supported, including a normal enqueue, an enqueue with an existing header, and an opaque enqueue. Each of these enqueue operations is described in further detail below. Note that for each type of enqueue, the use of shared memory allows for minimal or no data marshaling.

For a normal enqueue, space for the header is reserved at the front of the memory handle to be enqueued, with any data to be transferred following the memory locations reserved for the header. At enqueue, the parameters are written directly to the shared memory corresponding to the memory handle, and the memory handle is added to the shared memory queue. On the other side, the dequeuing process removes the memory handle from the SMQ and examines the flags and operation code in the header. The flags indicate the type of enqueue. After examining the flags, the dequeuing process calls the appropriate operation code handler with the parameters contained within the header. The dequeuing process is able to use the same shared memory and process agnostic memory handle in its response, if appropriate for the protocol; otherwise, the dequeuing process may free the memory associated with the memory handle.

An opaque enqueue reduces the processing to enqueue an item. No header is used in the opaque enqueue, but enough space for flags and an operation code must be reserved at the first of the shared memory corresponding to the memory handle. At enqueue, the memory handle is added to the shared memory queue, but any information other than the operation code and flags is written to the shared memory. A separate function call is used for opaque enqueues given the limited amount of information that the call requires. Opaque enqueues are not registered. On the other side, the dequeuing process removes the memory handle from the SMQ and examines the flags and operation code in the header. The flags indicate that no information other than the flags and operation code are available. After examining the flags, the dequeuing process calls the appropriate operation code handler.

To assure a response, an item may be registered as part of an enqueue. (Unlike synchronous interprocess communication, outstanding requests are not inherently tracked in an asynchronous interprocess communication environment.) During registration, the memory handle for each item added to an SMQ also is placed on a registration list. At a later time, the registration list can be examined to identify enqueued items that have not received a response, and those outstanding requests may be negatively acknowledged ("NAK'd") so that any needed cleanup operations may be performed. For example, an enqueued item may be dequeued by a remote process. Problems with the remote process, such as the termination of a particular protocol, the abnormal termination of the process itself, etc., may prevent the remote process from responding. When the enqueuing process determines that the remote process is unable to respond, by receiving a protocol or process termination signal or by some other mechanism, each registered enqueue is NAK'd so that resources allocated as part of the enqueue may be reclaimed.

To reduce contention on the registration list, the list is subdivided into sixteen sublists, each with its own lock, so that sixteen separate threads can register/deregister SMQ items or entries at the same time. A hash function determines which of the sublists should receive a particular item. The function divides the lower sixteen bits of a process agnostic memory handle's address pointer into four four-bit sets. Each set of four bits (representing 0–15) are added together and then divided by sixteen. The final remainder is the sublist number (0 to 15). The lock for each sublist is implemented as a critical section.

Note that the foregoing hash function produces perfect distribution across all possible memory allocations. Additionally, it produces perfect sequential distribution, such that 32 allocations of the same sized blocks, that are also sequential in memory, will be perfectly distributed. Blocks allocated in increasing sizes (i.e., 32 bytes, 64 bytes, 128 bytes, . . . ), where each block is in the same state, are perfectly distributed as well. Naturally, once memory becomes fragmented, any two allocations may hash to the same registration list, but overall, the hash function perfectly distributes every set of 16 adjacent blocks.

The pceqB->HrSetThreadThreshold 482 call helps determine if process A 410 should be signaled to create a new worker thread or if the current number of worker threads is adequate. Although making calls to pceqB->HrSetThreadThreshold 482 and pceqB->HrSetThreadThreshold 458 provides some control to the enqueuing process over the number of threads available in the dequeuing processes, the dequeuing process is likely to include its own logic to control the number of threads. In other words, the dequeuing process makes the determination of whether to create a new thread or not, but calling pceqB->HrSetThreadThreshold informs the dequeuing process of the enqueuing process' preference or analysis of the number of threads that should be available. Other processing 486 continues in process B 420 while the enqueue is pending, demonstrating the asynchronous aspect of the present invention.

In process A 410, a notify thread posts to the I/O completion port 488 associated with a particular SMQ. Process A 410 is responsible for determining that the completion key matches a completion key specified in binding the SMQs between process A 410 and process B 420. Calling pceq->IOCPNotification 492 dequeues an item from a particular SMQ, and pceq->Dispatch 494 calls the appropriate handler function. Note that pceq->IOCPNotification 492 and pceq->Dispatch 494 represent a single controller for each SMQ (and protocol). Process A 410 handles the operation code and enqueues a result, as required. Those of skill in the art will recognize that if process A 410 and process B 420 are running on separate processors, no context switches are required between enqueuing and dequeuing items using an SMQ.

Figure 7A:
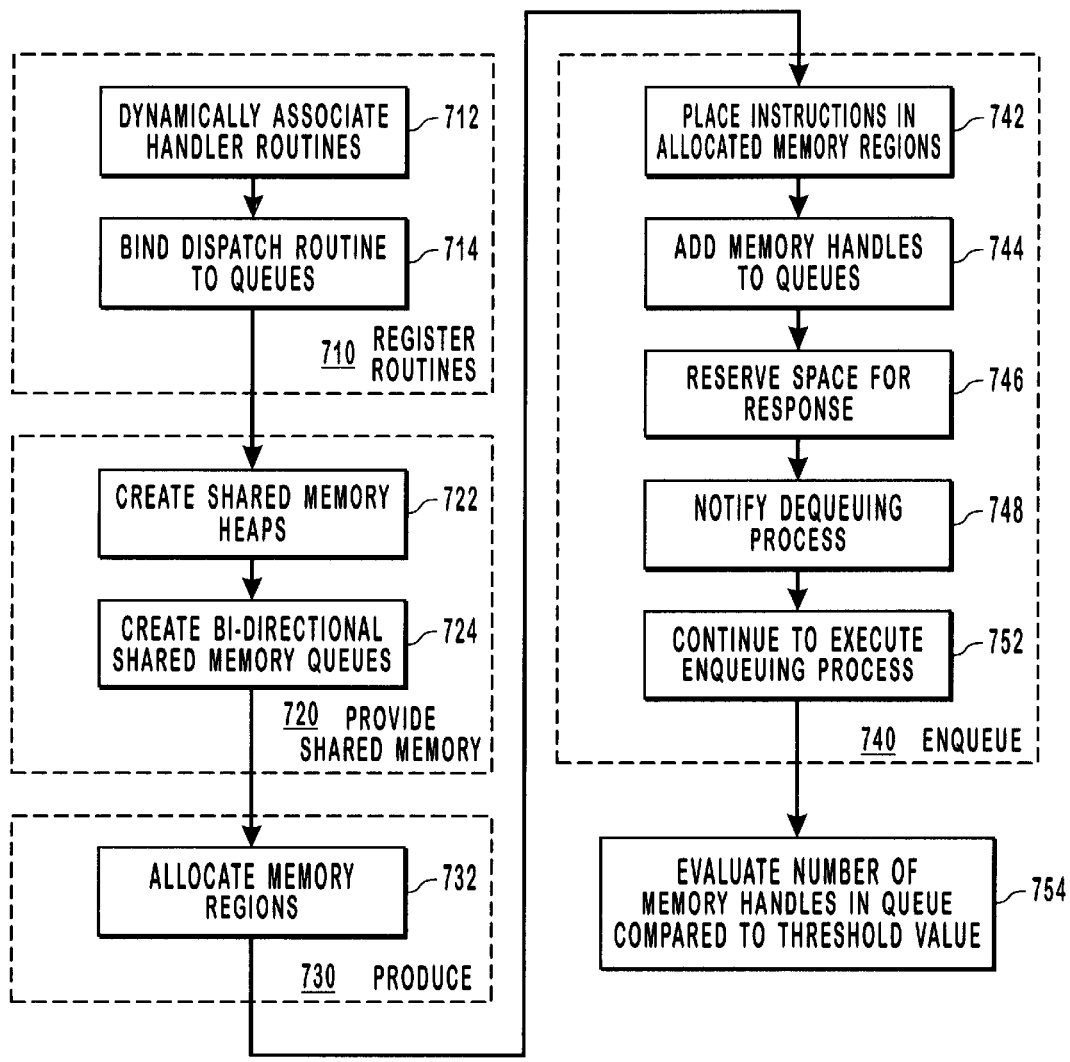
FIGS. 7A–7B show an exemplary method of high-performance interprocess communication according to the present invention.
Figure 7B:
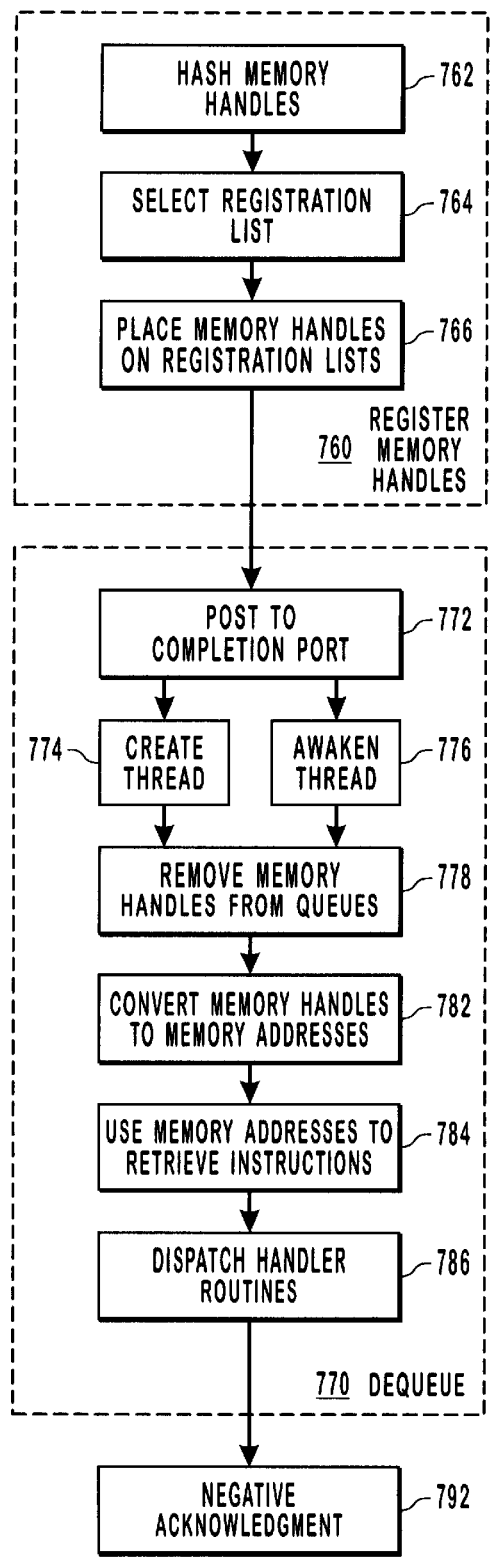

FIGS. 7A–7B show an exemplary method of high-performance interprocess communication according to the present invention. Those of skill in the art will recognize that the steps and acts described with reference to FIGS. 7A–7B are not necessarily limited to any particular order. A step for registering (710) one or more handler routines may include the act of dynamically associating (712) handler routines with a dispatch routine and the act of binding (714) a dispatch routine to an SMQ. The registered routines or functions handle the instructions included within an enqueued item—the operation codes stored in memory that are referenced by a process agnostic memory handle. Because the routines may change over time, each side of the communication should check the revision of software running on the other side to assure compatibility.

A step for providing shared memory (720) may include the acts of creating (722) one or more shared memory heaps and creating (724) one or more bi-directional shared memory queues. The shared memory heap may be implemented as one or more shared memory block heaps and a bi-directional shared memory queue may be implemented as a pair of unidirectional circular queues. Other suitable heap and queue arrangements are well-known in the art and should be considered within the scope of the present invention. A step for producing (730) one or more process agnostic memory handles includes the acts of allocating (732) one or more memory regions from the shared memory heaps described above.

A step for enqueuing (740) one or more process agnostic memory handles may include the following acts: placing (742) an instruction in the allocated memory regions; adding (744) the one or more memory handles to the one or more shared memory queues; reserving (746) space for one or more responses; notifying (748) the dequeuing process of the enqueued items; and continuing (752) to execute in the enqueuing process. The present invention is not limited to any particular type of instruction or any particular implementation of process agnostic memory handles. The use of operation codes and the specific memory handle identified with respect to FIG. 5 are merely exemplary.

The act of evaluating (754) the number of memory handles in an SMQ compared to a threshold value relates to the enqueuing process actively considering whether or not the dequeuing process should be signaled to provide one or more additional worker threads. As explained previously, the dequeuing process makes the final determination of whether a new thread is created or not, but this occurs retrospectively in the dequeuing process, after items have been enqueued. Because the enqueuing process knows of items added to an SMQ as the enqueuing occurs, the enqueuing process may be in a somewhat better position to determine whether additional dequeuing threads are needed, either by awakening an idle thread or by creating a new thread.

A step for registering (760) memory handles may include an act of hashing (762) a memory handle to select a particular list from among several registration lists that are available. To avoid contention, the hashing function should evenly distribute memory handles across all registration lists, although the present invention does not necessarily require perfect distribution. The step for registering (760) also may include the act of selecting (764) a registration list and placing (766) one or more memory handles on one or more available registration lists.

A step for dequeuing (770) one or more process agnostic memory handles from one or more SMQs may include the act of posting (772) to a completion port. Dequeuing (770) also may include the acts of creating (774) a new thread or awakening (776) an idle thread. Additionally, removing (778) one or more memory handles from the one or more SMQs and converting (782) the one or more handles to memory addresses may be part of the step for dequeuing (770). Memory address should be interpreted broadly to encompass any form of direct or indirect memory access, including a pointer to a memory location, a reference to a memory location, a handle, etc. The step for dequeuing also may include the acts of using (784) the memory address to retrieve the instruction from the one or more memory handles and dispatching (786) the appropriate handler routines. Although not shown, the step for dequeuing (770) further may include the act of removing one or more memory handles from an available registration list when a response is received. When no response is received, the present invention may include an act of negatively acknowledging (792) a registered memory handle so that resources associated with the memory handle may be reclaimed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computerized system that includes multiple processes performing a variety of operations, wherein at least two processes communicate with each other in accomplishing a particular objective, and wherein communicating between the at least two processes may cause context switches, data marshaling, kernel transitions, and blocking, that reduce the operating efficiency of the computerized system, a high-performance method of interprocess communication, the method comprising the acts of:

creating one or more shared memory heaps that may be accessed by an enqueuing process and a dequeuing process;

creating one or more bi-directional shared memory queues that may be accessed by the enqueuing process and the dequeuing process;

allocating one or more memory regions from the one or more shared memory heaps, wherein the allocating produces a process agnostic memory handle for each of the allocated memory regions;

the enqueuing process placing an instruction in one or more allocated memory regions;

the enqueuing process adding one or more process agnostic memory handles to the one or more bi-directional shared memory queues; and the enqueuing process expecting to receive a response back from the dequeuing process;

the enqueuing process adding at least one of the one or more process agnostic memory handles to a registration list so the at least one process agnostic memory handle can be identified if no response is received back from the dequeuing process; and the dequeuing process removing at least one of the one or more process agnostic memory handles from the one or more bi-directional shared memory queues.

2. A method as recited in claim 1, wherein the enqueuing process and the dequeuing process are asynchronous, the method further comprising the act of the enqueuing process continuing to execute after adding the one or more process agnostic memory handles to the one or more bi-directional shared memory queues.

3. A method as recited in claim 2, further comprising the act of the enqueuing process reserving space in at least one of the one or more bi-directional shared memory queues for the response expected back from the dequeuing process.

4. A method as recited in claim 1, further comprising the act of negatively acknowledging at least one of the one or more processes agnostic memory handles that has not received a response.

5. A method as recited in claim 1, wherein multiple registration lists are available to identify process agnostic memory handles, the method further comprising the act of hashing the at least one of the one or more process agnostic memory handles to select a single registration list from among the multiple registration lists that are available.

6. A method as recited in claim 1, further comprising the act of the enqueuing process adding multiple process agnostic memory handles to one bi-directional shared memory queue, prior to the dequeuing process removing one or more process agnostic memory handles from the one bi-directional shared memory queue.

7. A method as recited in claim 1, wherein the computerized system includes multiple processors, the method further comprising the act of running the enqueuing process and the dequeuing process on separate processors.

8. A method as recited in claim 1, wherein the enqueuing process and the dequeuing process are used in supporting one or more communication protocols, and wherein each supported communication protocol uses a separate bi-directional shared memory queue, the method further comprising the acts of binding at least one of the one or more supported communication protocols to a bi-directional shared memory queue that has been created to support that communication protocol.

9. A method as recited in claim 8, wherein the one or more supported communication protocols include at least one of (i) simple mail transfer protocol, (ii) post office protocol, (iii) Internet message protocol, (iv) network news transfer protocol, and (v) distributed authoring and versioning protocol.

10. A method as recited in claim 1, wherein at least one of the one or more bi-directional shared memory queues is a pair of unidirectional circular queues.

11. A method as recited in claim 1, further comprising the act of the dequeuing process dynamically associating one or more handler routines with a dispatch routine, wherein each handler routine corresponds to one or more of the instructions that may be placed in the one or more allocated shared memory regions.

12. A method as recited in claim 11, further comprising the acts of:

the dequeuing process converting at least one of the one or more memory handles to at least one memory address in accordance with the address space of the dequeuing process;

the dequeuing process using the at least one memory address to retrieve at least one instruction from the one or more allocated shared memory regions; and dispatching an appropriate handler routine for the at least one instruction from the one or more allocated shared memory regions.

13. A method as recited in claim 1, wherein the at least one instruction comprises an operation code.

14. A method as recited in claim 13, wherein the at least one instruction further comprises at least one of (i) a copy of the memory handle, (ii) one or more parameters, (iii) one or more flags, and (iv) data.

15. A method as recited in claim 1, wherein the one or more shared memory heaps comprise one or more block heaps, and wherein each of the one or more block heaps comprises (i) one or more segments of memory divided into one or more groups of equal-sized blocks, (ii) a free list for each group of equal-sized blocks, and (iii) a mutex for each group of equal-sized blocks.

16. A method as recited in claim 1, wherein each of the one or more process agnostic memory handles includes a segment identifier, an offset, and a block size.

17. A method as recited in claim 1, further comprising the act of notifying the dequeuing process that the one or more process agnostic memory handles have been added to the one or more bi-directional shared memory queues.

18. A method as recited in claim 1, wherein the enqueuing process and dequeuing process comprise one or more threads.

19. A method as recited in claim 18, wherein the enqueuing process and the dequeuing process comprise at least one notify thread and one or more worker threads.

20. A method as recited in claim 19, wherein the at least one notify threads in the enqueuing process and in the dequeuing process receive event signals, and wherein an expected event signal is at least one of (i) a signal indicating at least one new process agnostic memory handle has been added to the one or more bi-directional shared memory queues, (ii) a signal indicating that at least one shared memory queue in at least one of the processes is shutting down, and (iii) a signal indicating that one of the processes has terminated.

21. A method as recited in claim 19, wherein at least one completion port is associated with each notify thread, the method further comprising the act of posting a completion status packet to the completion port when a signal indicating at least one new process agnostic memory handle has been added to the one or more bi-directional shared memory queues.

22. A method as recited in claim 21, further comprising the act of either creating a new worker thread or awakening an idle worker thread in response to a completion status packet being posted to the completion port.

23. A method as recited in claim 22, wherein either the new worker thread or the idle worker thread removes multiple process agnostic memory handles from one bi-directional shared memory queue.

24. A method as recited in claim 22, further comprising the act of evaluating the number of process agnostic memory handles in the one or more bi-directional shared memory queues in relation to multiples of a threshold value, wherein one or more additional worker threads are requested when the number of process agnostic memory handles in the one or more bi-directional shared memory queues first exceeds a multiple of the threshold value.

25. A method as recited in claim 1, wherein the computerized system comprises a content store.

26. A method as recited in claim 1, wherein the computerized system comprises a data cache.

27. In a computerized system that includes multiple processes performing a variety of operations, wherein at least two processes communicate with each other in accomplishing a particular objective, and wherein communicating between the at least two processes may cause context switches, data marshaling, kernel transitions, and blocking, that reduce the operating efficiency of the computerized system, a high-performance method of interprocess communication, the method comprising steps for:

providing shared memory that includes one or more shared memory heaps and one or more bi-directional shared memory queues, wherein the one or more shared memory heaps and the one or more bi-directional shared memory queues may be accessed by an enqueuing process and a dequeuing process;

producing one or more process agnostic memory handles, wherein the one or more process agnostic memory handles each correspond to one or more memory regions allocated from the one or more shared memory heaps;

enqueuing the one or more process agnostic memory handles to the one or more bi-directional shared memory queues, wherein each of the one or more memory regions corresponding to the one or more process agnostic memory handles contains an instruction;

registering one or more process agnostic memory handles that are added to the one or more bi-directional shared memory queues, wherein registered process agnostic memory handles may be identified if a response is expected back from the dequeuing process, but no response is received; and dequeuing one or more of the process agnostic memory handles from the one or more bi-directional shared memory queues.

28. A method as recited in claim 27, wherein the step for providing one or more shared memory heaps and one or more bi-directional shared memory queues comprises the acts of:

creating one or more shared memory heaps that may be accessed by the enqueuing process and the dequeuing process; and creating one or more bi-directional shared memory queues that may be accessed by the enqueuing process and the dequeuing process.

29. A method as recited in claim 27, wherein the step for producing one or more process agnostic memory handles comprises the act of allocating one or more memory regions from the one or more shared memory heaps, and wherein the shared memory handles include a segment identifier, an offset, and a block size.

30. A method as recited in claim 27, wherein the step for enqueuing the one or more process agnostic memory handles to the one or more bi-directional shared memory queues comprises the acts of:

placing an instruction in one or more allocated memory regions; and adding the one or more process agnostic memory handles to the one or more bi-directional shared memory queues.

31. A method as recited in claim 30, wherein the enqueuing process and the dequeuing process are asynchronous, and wherein the enqueuing process expects to receive a response back from the dequeuing process, and wherein the step for enqueuing the one or more process agnostic memory handles to the one or more bi-directional shared memory queues further comprises the acts of:

reserving space in at least one of the one or more bi-directional shared memory queues for the response expected back from the dequeuing process; and continuing to execute after adding the one or more process agnostic memory handles to the one or more bi-directional shared memory queues.

32. A method as recited in claim 30, wherein the step for enqueuing the one or more process agnostic memory handles to the one or more bi-directional shared memory queues further comprises the acts of:

adding multiple process agnostic memory handles to one bi-directional shared memory queue, prior to the step for dequeuing one or more of the process agnostic memory handles from the one or more bi-directional shared memory queues; and notifying the dequeuing process that one or more process agnostic memory handles have been added to the one bi-directional shared memory queue.

33. A method as recited in claim 27, wherein the step for dequeuing one or more of the process agnostic memory handles from the one or more bi-directional shared memory queues comprises the act of removing at least one of the one or more process agnostic memory handles from the one or more bi-directional shared memory queues.

34. A method as recited in claim 33, further comprising a step for registering one or more handler routines.

35. A method as recited in claim 34, wherein the step for registering one or more handler routines comprises the act of dynamically associating one or more handler routines with a dispatch routine, wherein each handler routine corresponds to one or more of the instructions contained in the one or more allocated shared memory regions.

36. A method as recited in claim 34, wherein the enqueuing process and the dequeuing process are used in supporting one or more communication protocols, and wherein each supported communication protocol uses a separate bi-directional shared memory queue, and wherein the step for registering one or more handler routines comprises the act of binding at least one of the one or more supported communication protocols to a bi-directional shared memory queue that has been created to support that communication protocol.

37. A method as recited in claim 34, wherein the step for dequeuing one or more of the process agnostic memory handles from the one or more bi-directional shared memory queues further comprises the acts of:

converting at least one of the one or more memory handles to at least one memory address in accordance with the address space of the dequeuing process;

using the at least one memory address to retrieve at least one instruction from the one or more allocated shared memory regions; and dispatching an appropriate handler routine for the at least one instruction from the one or more allocated shared memory regions.

38. A method as recited in claim 33, wherein the enqueuing process and the dequeuing process comprise at least one notify thread and one or more worker threads, and wherein at least one completion port is associated with the at least one notify thread, the step for dequeuing one or more of the process agnostic memory handles from the one or more bi-directional shared memory queues further comprising the acts of:

posting a completion status packet to the completion port when the notify thread is signaled that at least one new process agnostic memory handle has been added to the one or more bi-directional shared memory queues; and creating a new worker thread or awakening an idle worker thread in response to a completion status packet being posted to the completion port.

39. A method as recited in claim 38, further comprising the act of evaluating the number of process agnostic memory handles in the one or more bi-directional shared memory queues in relation to multiples of a threshold value, wherein one or more additional worker threads are requested when the number of process agnostic memory handles in the one or more bi-directional shared memory queues first exceeds a multiple of the threshold value.

40. A method as recited in claim 27, wherein the step for registering one or more process agnostic memory handles that are added to the one or more bi-directional shared memory queues comprises the acts of:

if multiple registration lists are available, hashing the one or more process agnostic memory handles to select a single registration list from among the multiple registration lists available;

if a single registration list is available, selecting the single registration list; and placing the one or more process agnostic memory handles on the selected registration list.

41. A method as recited in claim 40 further comprising the act of negatively acknowledging at least one registered process agnostic memory handle that has not received a response.

42. A method as recited in claim 27, wherein at least one of the one or more bi-directional shared memory queues is a pair of unidirectional circular queues.

43. A method as recited in claim 27, wherein the instruction contained within each of the one or more memory regions corresponding to the one or more process agnostic memory handles comprises an operation code.

44. A method as recited in claim 27, wherein the computerized system comprises one of a content store and a data cache.

45. In a computerized system that includes multiple processes performing a variety of operations, wherein at least two processes communicate with each other in accomplishing a particular objective, and wherein communicating between the at least two processes may cause context switches, data marshaling, kernel transitions, and blocking, that reduce the operating efficiency of the computerized system, a computer program product for implementing a high-performance method of interprocess communication, comprising:

a computer readable medium for carrying machine-executable instructions for implementing the method; and wherein said method is comprised of machine-executable instructions for performing the acts of:

creating one or more shared memory heaps that may be accessed by an enqueuing process and a dequeuing process;

creating one or more bi-directional shared memory queues that may be accessed by the enqueuing process and the dequeuing process;

allocating one or more memory regions from the one or more shared memory heaps, wherein the allocating produces a process agnostic memory handle for each of the allocated memory regions;

the enqueuing process placing an instruction in one or more allocated memory regions;

the enqueuing process adding one or more process agnostic memory handles to the one or more bi-directional shared memory queues, the enqueuing process expecting to receive a response back from the dequeuing process;

the enqueuing process adding at least one of the one or more process agnostic memory handles to a registration list so the at least one process agnostic memory handle can be identified if no response is received back from the dequeuing process; and the dequeuing process removing at least one of the one or more process agnostic memory handles from the one or more bi-directional shared memory queues.

46. A computer program product as recited in claim 45, wherein the enqueuing process and the dequeuing process are asynchronous, the method further comprising the act of the enqueuing process continuing to execute after adding the one or more process agnostic memory handles to the one or more bi-directional shared memory queues.

47. A computer program product as recited in claim 46, wherein the method further comprises the act of the enqueuing process reserving space in at least one of the one or more bi-directional shared memory queues for the response expected back from the dequeuing process.

48. A computer program product as recited in claim 45, the method further comprising the act of negatively acknowledging at least one of the one or more processes agnostic memory handles that has not received a response.

49. A computer program product as recited in claim 45, wherein multiple registration lists are available to identify process agnostic memory handles, the method further comprising the act of hashing the at least one of the one or more process agnostic memory handles to select a single registration list from among the multiple registration lists that are available.

50. A computer program product as recited in claim 45, the method further comprising the act of the enqueuing process adding multiple process agnostic memory handles to one bi-directional shared memory queue, prior to the dequeuing process removing one or more process agnostic memory handles from the one bi-directional shared memory queue.

51. A computer program product as recited in claim 45, wherein the computerized system includes multiple processors, the method further comprising the act of running the enqueuing process and the dequeuing process on separate processors.

52. A computer program product as recited in claim 45, wherein the enqueuing process and the dequeuing process are used in supporting one or more communication protocols, and wherein each supported communication protocol uses a separate bi-directional shared memory queue, the method further comprising the acts of binding at least one of the one or more supported communication protocols to a bi-directional shared memory queue that has been created to support that communication protocol.

53. A computer program product as recited in claim 52, wherein the one or more supported communication protocols include at least one of (i) simple mail transfer protocol, (ii) post office protocol, (iii) Internet message protocol, (iv) network news transfer protocol, and (v) distributed authoring and versioning protocol.

54. A computer program product as recited in claim 45, wherein at least one of the one or more bi-directional shared memory queues is a pair of unidirectional circular queues.

55. A computer program product as recited in claim 45, the method further comprising the act of the dequeuing process dynamically associating one or more handler routines with a dispatch routine, wherein each handler routine corresponds to one or more of the instructions that may be placed in the one or more allocated shared memory regions.

56. A computer program product as recited in claim 55, the method further comprising the acts of:
the dequeuing process converting at least one of the one or more memory handles to at least one memory address in accordance with the address space of the dequeuing process;
the dequeuing process using the at least one memory address to retrieve at least one instruction from the one or more allocated shared memory regions; and
dispatching an appropriate handler routine for the at least one instruction from the one or more allocated shared memory regions.

57. A computer program product as recited in claim 45, wherein the at least one instruction comprises an operation code.

58. A computer program product as recited in claim 57, wherein the at lest one instruction further comprises at least one of (i) a copy of the memory handle, (ii) one or more parameters, (iii) one or more flags, and (iv) data.

59. A computer program product as recited in claim 45, wherein the one or more shared memory heaps comprise one or more block heaps, and wherein each of the one or more block heaps comprises (i) one or more segments of memory divided into one or more groups of equal-sized blocks, (ii) a free list for each group of equal-sized blocks, and (iii) a mutex for each group of equal-sized blocks.

60. A computer program product as recited in claim 45, wherein each of the one or more process agnostic memory handles includes a segment identifier, an offset, and a block size.

61. A computer program product as recited in claim 45, the method further comprising the act of notifying the dequeuing process that the one or more process agnostic memory handles have been added to the one or more bi-directional shared memory queues.

62. A computer program product as recited in claim 45, wherein the enqueuing process and dequeuing process comprise one or more threads.

63. A computer program product as recited in claim 62, wherein the enqueuing process and the dequeuing process comprise at least one notify thread and one or more worker threads.

64. A computer program product as recited in claim 63, wherein the at least one notify threads in the enqueuing process and in the dequeuing process receive event signals, and wherein an expected event signal is at least one of (i) a signal indicating at least one new process agnostic memory handle has been added to the one or more bi-directional shared memory queues, (ii) a signal indicating that at least one shared memory queue in at least one of the processes is shutting down, and (iii) a signal indicating that one of the processes has terminated.

65. A computer program product as recited in claim 63, wherein at least one completion port is associated with each notify thread, the method further comprising the act of posting a completion status packet to the completion port when a signal indicating at least one new process agnostic memory handle has been added to the one or more bi-directional shared memory queues.

66. A computer program product as recited in claim 65, the method further comprising the act of either creating a new worker thread or awakening an idle worker thread in response to a completion status packet being posted to the completion port.

67. A computer program product as recited in claim 66, wherein either the new worker thread or the idle worker thread removes multiple process agnostic memory handles from one bi-directional shared memory queue.

68. A computer program product as recited in claim 66, the method further comprising the act of evaluating the number of process agnostic memory handles in the one or more bi-directional shared memory queues in relation to multiples of a threshold value, wherein one or more additional worker threads are requested when the number of process agnostic memory handles in the one or more bi-directional shared memory queues first exceeds a multiple of the threshold value.

69. A computer program product as recited in claim 45, wherein the computerized system comprises one of a content store and a data cache.

70. In a computerized system that includes multiple processes performing a variety of operations, wherein at least two processes communicate with each other in accomplishing a particular objective, and wherein communicating between the at least two processes may cause context switches, data marshaling, kernel transitions, and blocking, that reduce the operating efficiency of the computerized system, a high-performance method of interprocess communication, the method comprising steps for:
providing shared memory that includes one or more shared memory heaps and one or more bi-directional shared memory queues, wherein the one or more shared memory heaps and the one or more bi-directional shared memory queues may be accessed by an enqueuing process and a dequeuing process;
producing one or more process agnostic memory handles, wherein the one or more process agnostic memory handles each correspond to one or more memory regions allocated from the one or more shared memory heaps;
enqueuing the one or more process agnostic memory handles to the one or more bi-directional shared memory queues, wherein each of the one or more memory regions corresponding to the one or more process agnostic memory handles contains an instruction; and
dequeuing the one or more process agnostic memory handles from the one or more bi-directional shared memory queues;
the enqueuing process and the dequeuing process comprising at least one notify thread and one or more worker threads, wherein at least one completion port is associated with the at least one notify thread, the step for dequeuing comprising the acts of:
removing one or more of the process agnostic memory handles from the one or more bi-directional shared memory queues,
posting a completion status packet to the completion port when the notify thread is signaled that at least one new process agnostic memory handle has been added to the one or more bi-directional shared memory queues; and creating a new worker thread or awakening an idle worker thread in response to a completion status packet being posted to the completion port; and the act of evaluating the number of process agnostic memory handles in the one or more bi-directional shared memory queues in relation to multiples of a threshold value, wherein one or more additional worker threads are requested when the number of process agnostic memory handles in the one or more bi-directional shared memory queues first exceeds a multiple of the threshold value.

\* \* \* \* \*